US012672998B2

(12) United States Patent
Lin

(10) Patent No.: US 12,672,998 B2
(45) Date of Patent: Jul. 7, 2026

(54) DUAL-PURPOSE HIP AND KNEE JOINT REHABILITATION APPARATUS

(71) Applicant: Jin-Jhong Lin, Taipei City (TW)

(72) Inventor: Jin-Jhong Lin, Taipei City (TW)

( * ) Notice: Subject to any disclaimer, the term of this patent is extended or adjusted under 35 U.S.C. 154(b) by 502 days.

(21) Appl. No.: 18/462,957

(22) Filed: Sep. 7, 2023

(65) Prior Publication Data

US 2024/0082097 A1 Mar. 14, 2024

(30) Foreign Application Priority Data

Sep. 8, 2022 (TW) ................................ 111134277

(51) Int. Cl.
*A61H 1/02* (2006.01)

(52) U.S. Cl.
CPC ..... *A61H 1/0255* (2013.01); *A61H 2201/123* (2013.01)

(58) Field of Classification Search
CPC .......... A61H 1/02; A61H 1/0237–0244; A61H 1/0255–0259; A61H 2001/0207; A61H 2001/0248; A61H 2201/123; A61H 2201/164–1642; A61H 2201/1664; A61H 2203/0425; A61H 2203/0437–0462; A61H 2205/088–104
See application file for complete search history.

(56) References Cited

U.S. PATENT DOCUMENTS 3,060,926 A * 10/1962 May ..................... A61G 13/009 601/35
4,905,677 A * 3/1990 Pecheux ............. A61H 1/0259 601/33

* cited by examiner

*Primary Examiner* — Rachel T Sippel
(74) *Attorney, Agent, or Firm* — MUNCY, GEISSLER, OLDS & LOWE, P.C.

(57) ABSTRACT

A dual-purpose hip and knee joint rehabilitation apparatus, which includes at least a drive device, a hip joint rehabilitation frame, and a knee joint rehabilitation frame. A user can select and mount either the hip joint rehabilitation frame or the knee joint rehabilitation frame on the drive device for use; the drive device then provides a driving force to drive and control the hip joint rehabilitation frame or the knee joint rehabilitation frame to dynamically perform a reciprocating movement on the user's hip joint or knee joint. The dual-purpose hip and knee joint rehabilitation apparatus thus provides a rehabilitation structure for both the hip joint and knee joint.

7 Claims, 9 Drawing Sheets

DUAL-PURPOSE HIP AND KNEE JOINT REHABILITATION APPARATUS

BACKGROUND OF THE INVENTION

(a) Field of the Invention

The present invention relates to a dual-purpose hip and knee joint rehabilitation apparatus, and more particularly to a rehabilitation apparatus that dynamically provides a reciprocating movement on the hip joint or knee joint according to user requirements.

(b) Description of the Prior Art

Along with rapid economical development, the population of most developed countries is gradually heading towards an aging society. And because of physical aging and lack of exercise, the elderly are easily susceptible to muscle or joint stiffness, or even pathological changes such as muscular atrophy or degenerative arthritis. For teenagers and young adults, factors including excessive exercise or accidents (such as traffic accidents, etc.) cause the emergence of pathological problems that require prolonged therapy or recuperation. Therefore, it is necessary to carry out moderate rehabilitation exercises as a regular routine to maintain the function of muscles and joints.

However, for those who are unable to perform rehabilitation on their own, such as persons with limb paralysis, have had a stroke or are in a coma, or other similar conditions, or those for whom it's necessary to see professional medical staff, such as a rehabilitation physician or a physiotherapist, on a regular basis to assist in their rehabilitation, it is especially true to maintain the function of their hip and knee joints of the lower limbs, but is expensive in the long term.

Hence, the object explored in the present invention lies in providing a hip joint and knee joint structure or apparatus able to perform rehabilitation to resolve the above-described problems.

SUMMARY OF THE INVENTION

The main object of the present invention lies in providing a dual-purpose hip and knee joint rehabilitation apparatus, wherein a drive device provides a driving force, and a user is able to select a hip joint rehabilitation frame or a knee joint rehabilitation frame to mount on the drive device. When the user places their leg portion across the hip (knee) joint rehabilitation frame, a repetitive movement is performed on the hip joint or knee joint of the user's leg portion, thereby achieving the object of providing rehabilitation on the user's own accord.

With the main object of the present invention being to provide the dual-purpose hip and knee joint rehabilitation apparatus that is used for repetitive movement rehabilitation on a user's hip joint or knee joint according to their selected requirement, the rehabilitation apparatus comprises at least: a drive device, a hip joint rehabilitation frame, and a knee joint rehabilitation frame, whereby the user selects one of the rehabilitation frames to mount on the drive device; wherein:

The drive device comprises at least: one base, a first slide rail, a first slider, and a connecting rod. The base is provided with a drive screw, which is installed along the X-direction to the drive device. The first slide rail is mounted on the side of the base, so as to be configured parallel to the drive screw. The first slider is slide inserted on the first slide rail and the drive screw, to enable sliding along the X-direction to the drive device, and is drive controlled by the drive screw. And one end of the connecting rod is pivot connected to the base, while the other end is pivot connected to the knee joint rehabilitation frame.

The hip joint rehabilitation frame comprises at least a second slide rail, a second slider, and a leg and ankle support frame. The second slide rail is mounted on the first slider of the drive device, so as to be configured along the Y-direction to the drive device. The second slider is installed on the second slide rail, to enable sliding along the Y-direction to the drive device. And the leg and ankle support frame is fixed onto the second slider and is used to saddle support a user's leg and ankle; moreover, the leg and ankle support frame is equipped with a universal joint, which allows the leg and ankle support frame to be adjusted to a supporting angle to match the user's leg posture.

The knee joint rehabilitation frame comprises at least a bottom base, a support, and a leg bracket. The bottom base is mounted on the first slider of the drive device, to enable sliding along the X-direction to the drive device, and the bottom base is provided with a pivot portion along the Y-direction to the drive device. The support is separated into a front end and a rear end, wherein the bottom portion of the front end is fitted with a rotating shaft, which is pivot connected to the pivot portion; the top portion of the rear end of the support is pivot connected to a connecting rod of the drive device, and is used to control and limit the rotating angle of the support. The leg bracket is fitted to the support, and is used to saddle support a user's foot and lower leg.

Based on the above-described principal characteristics, the drive device uses at least an electric-powered motor to provide a driving force.

Based on the above-described secondary characteristics, the electric-powered motor is a stepping motor.

Based on the above-described principal characteristics, the drive device uses at least an air-powered motor to provide a driving force.

Based on the above-described principal characteristics, the leg bracket is provided with a foot portion and a support portion.

Based on the above-described principal characteristics, the leg bracket of the leg and ankle support frame further comprises at least one fastening strap, which is used to fasten a user's leg portion.

Based on the above-described principal characteristics, the support and the leg bracket of the knee joint rehabilitation frame is a single body.

To enable a further understanding of said objectives, structures, characteristics, and effects, as well as the technology and methods used in the present invention and effects achieved, a brief description of the drawings is provided below followed by a detailed description of the preferred embodiments.

DETAILED DESCRIPTION OF THE PREFERRED EMBODIMENTS

A detailed description of the technological means adopted to achieve the aforementioned object and effectiveness are provided below, together with the diagrams that show the preferred embodiment, structure, characteristics, and functions of the present invention to facilitate complete understanding thereof.

Figure 1:
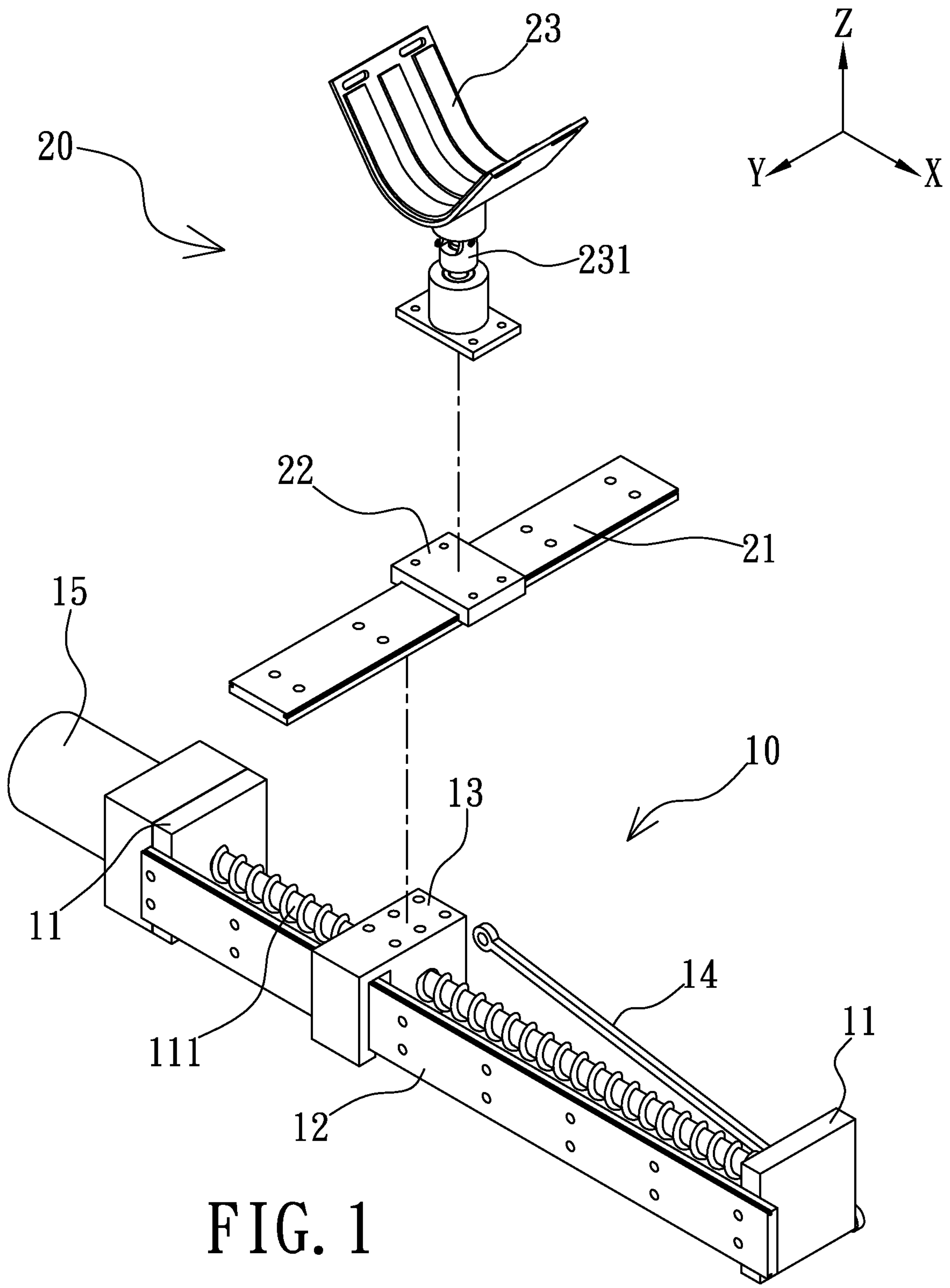
FIG. 1 is a first structural schematic view of the present invention.
Figure 3:
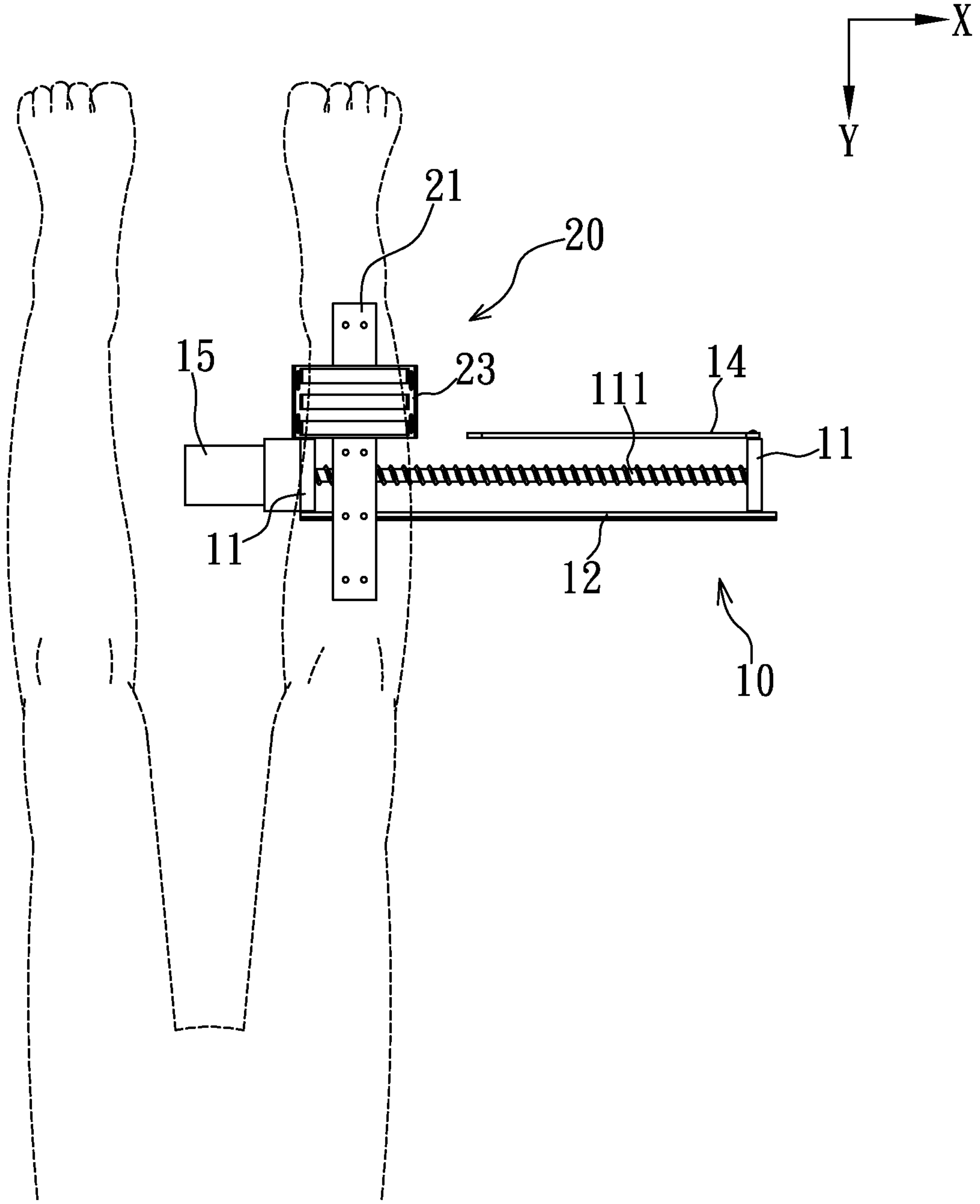
FIG. 3 is a first schematic view of a preferred embodiment of the present invention.
Figure 4:
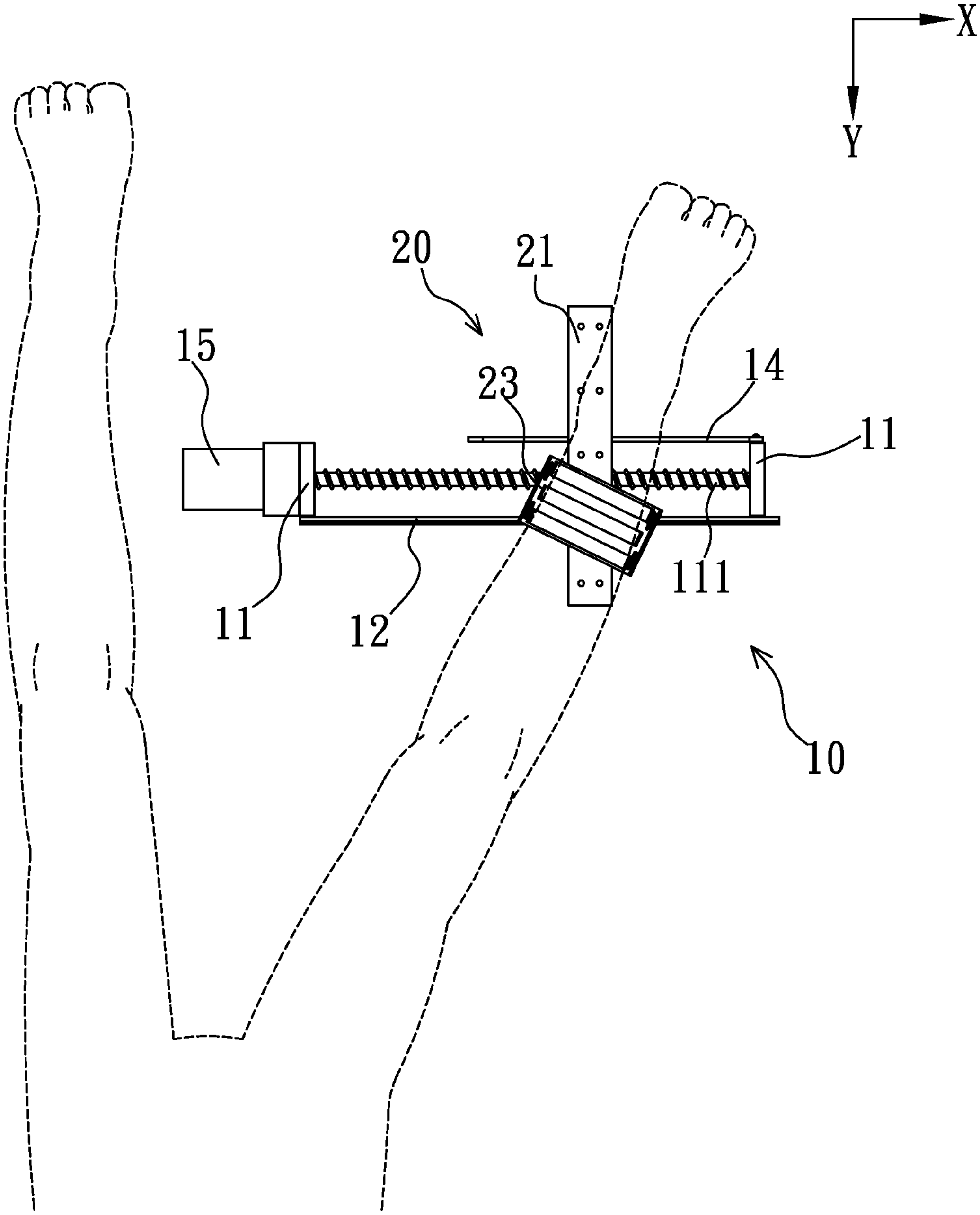
FIG. 4 is a second schematic view of the preferred embodiment of the present invention.
Figure 5:
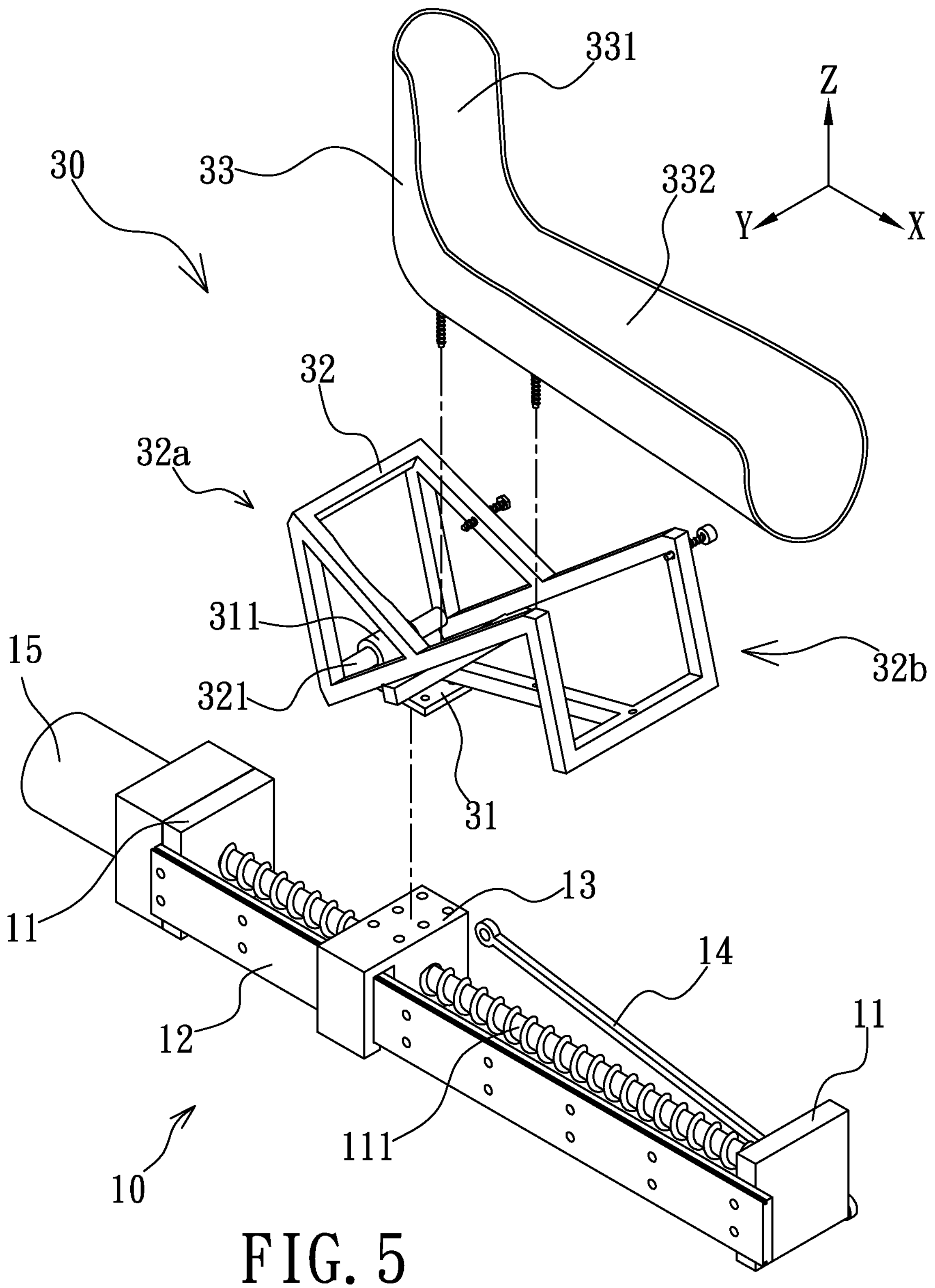
FIG. 5 is a second structural schematic view of the present invention.

Referring to FIGS. 1 to 9, and as shown in the diagrams the present invention provides a dual-purpose hip and knee joint rehabilitation apparatus, wherein the rehabilitation apparatus comprises at least a drive device 10, a hip joint rehabilitation frame 20, and a knee joint rehabilitation frame 30. A user selects one of the rehabilitation frames 20, 30 to mount on the drive device 10 (as shown in FIGS. 1 and 5) according to their requirements, and the drive device 10 provides a driving force to drive the hip joint rehabilitation frame 20 or the knee joint rehabilitation frame 30 to dynamically perform a reciprocating movement on the user's hip joint or knee joint for rehabilitation thereof.

More explicitly, the drive device 10 comprises at least: one base 11, a first slide rail 12, a first slider 13, and a connecting rod 14, wherein the base 11 is provided with a drive screw 111 that is fitted along the X direction of the shaft. The first slide rail 12 is mounted on the side of the base 11 parallel to the drive screw 111, and the first slider 13 is slide inserted on the first slide rail 12 and the drive screw 111, which enables the drive screw 111 to control the first slider 13. One end of the connecting rod 14 is pivot connected to the base 11, and the other end can be pivot connected to the knee joint rehabilitation frame 30.

In the preferred embodiment of the present invention, the drive device 10 uses at least an electric-powered or air-powered motor 15 to provide a driving force to control rotation of the drive screw 111, with an electric-powered motor being preferable. The electric-powered motor 15 can adopt a stepping motor, but can also adopt other driving forces that achieve the same effect.

Figure 2:
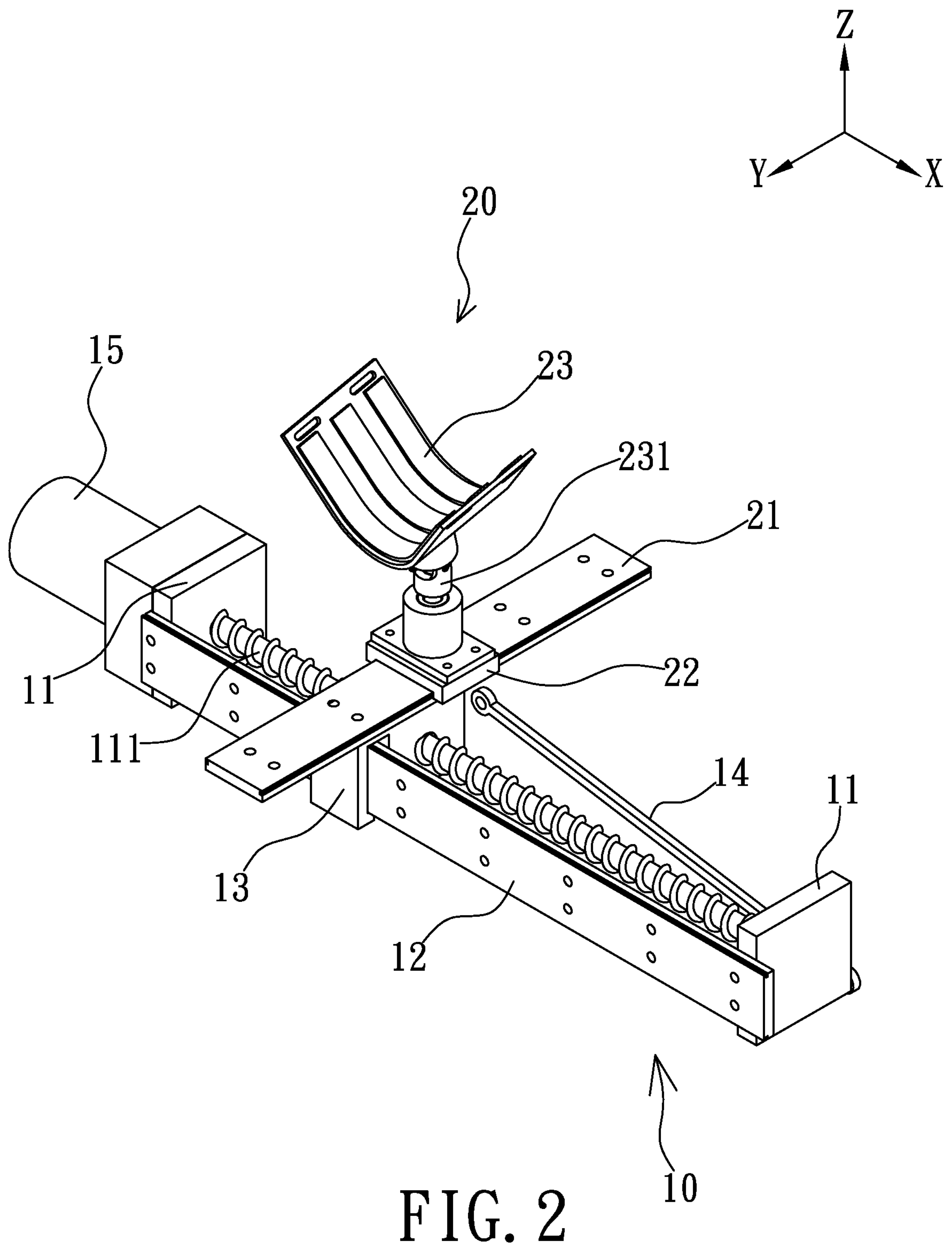
FIG. 2 is an assembled schematic view of FIG. 1.

When a user wants to perform rehabilitation on their hip joint, they can select and mount the hip joint rehabilitation frame 20 on the drive device 10 for use, wherein the hip joint rehabilitation frame 20 comprises at least a second slide rail 21, a second slider 22, and a leg and ankle support frame 23. The second slide rail 21 is fixedly locked and mounted on the first slider 13 of the drive device 10, whereby the second slide rail 21 is mounted along the Y-direction to the drive device 10. The second slider 22 is slide inserted on the second slide rail 21 (as shown in FIGS. 1 and 2); the leg and ankle support frame 23 is then fixed onto the second slider 22. Hence, when the user is lying down, they can place their leg and ankle on the leg and ankle support frame 23 (as shown in FIGS. 3 and 4). Moreover, the leg and ankle support frame 23 is equipped with a universal joint 231, which allows the leg and ankle support frame 23 to be adjusted to a more comfortable support angle to match the user's leg posture (as shown in FIGS. 2 to 4). When the drive device 10 rotates the drive screw 111, the drive screw 111 controls left/right sliding of the first slider 13 and the hip joint rehabilitation frame 20 along the X-direction to the drive device. During the sliding process of the first slider 13, because of the fixed length of the user's leg, the second slider 22 and the leg and ankle support frame 23 will slide back and forth along the Y-direction to the drive device 10 (as shown in FIGS. 3 and 4), accordingly performing a repetitive abduction movement on the user's leg, and thereby achieving the object of providing rehabilitation movement of the hip joint on the user's own accord.

Figure 6:
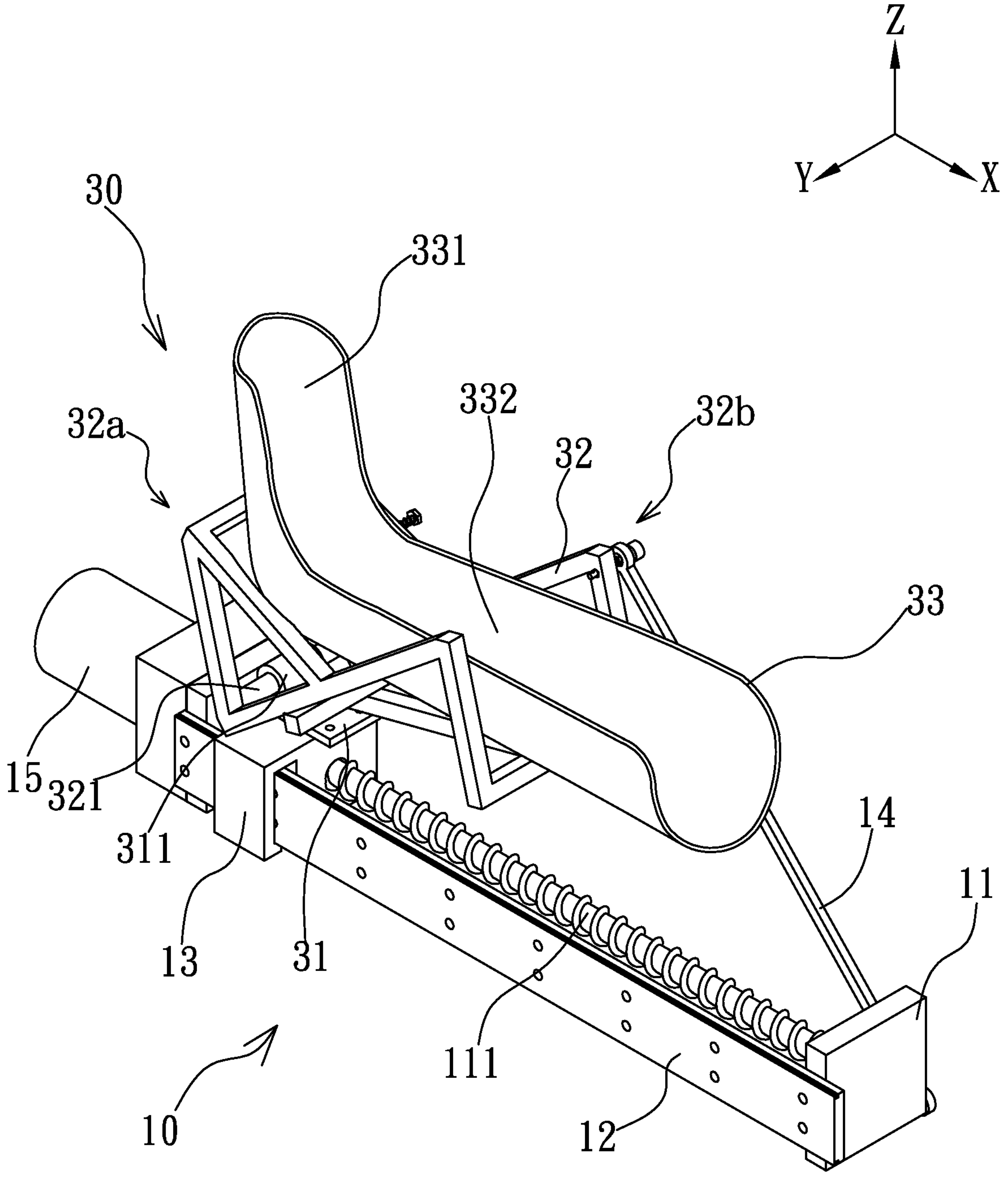
FIG. 6 is an assembled schematic view of FIG. 5.
Figure 7:
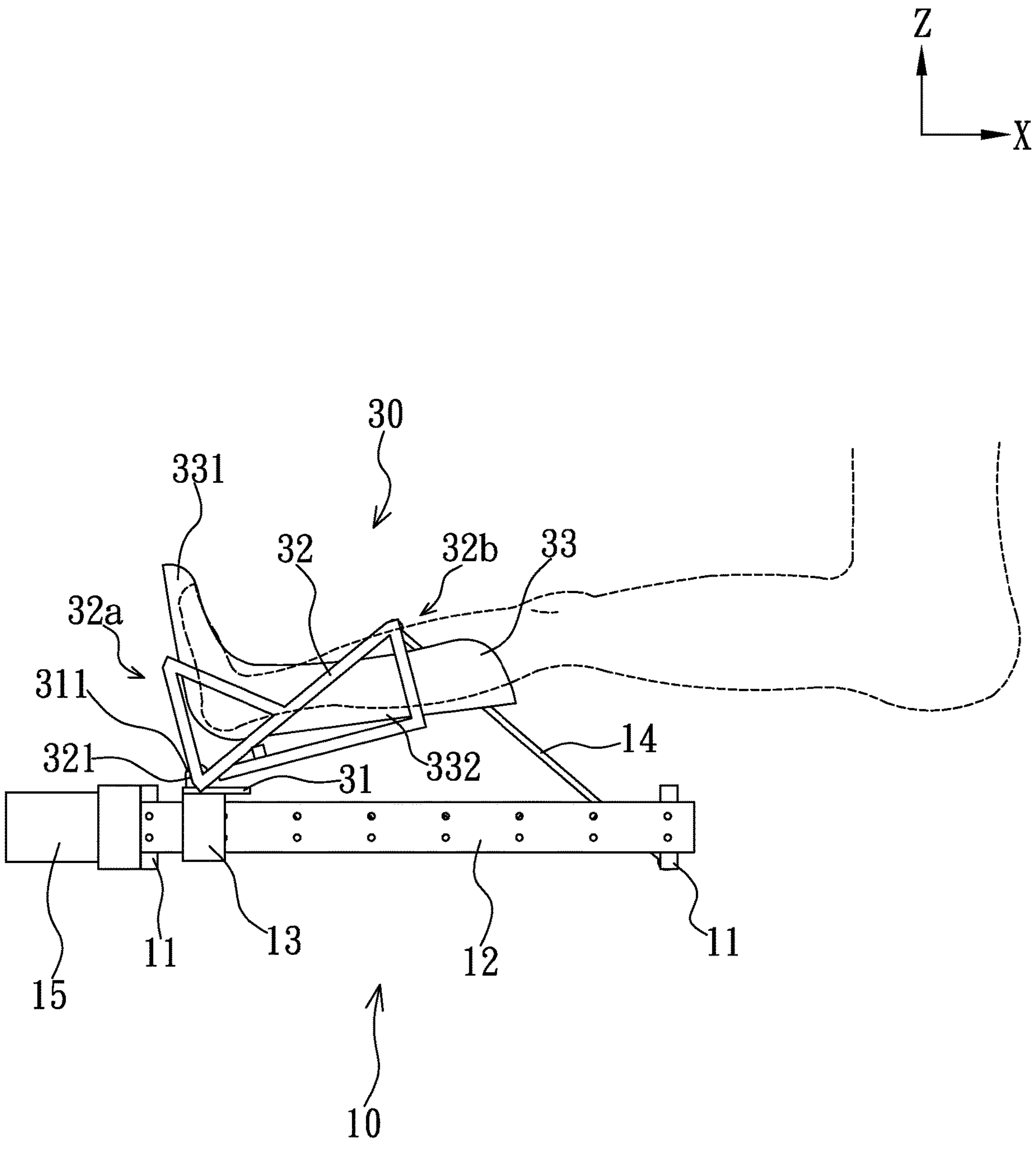
FIG. 7 is a third schematic view of the preferred embodiment of the present invention.
Figure 8:
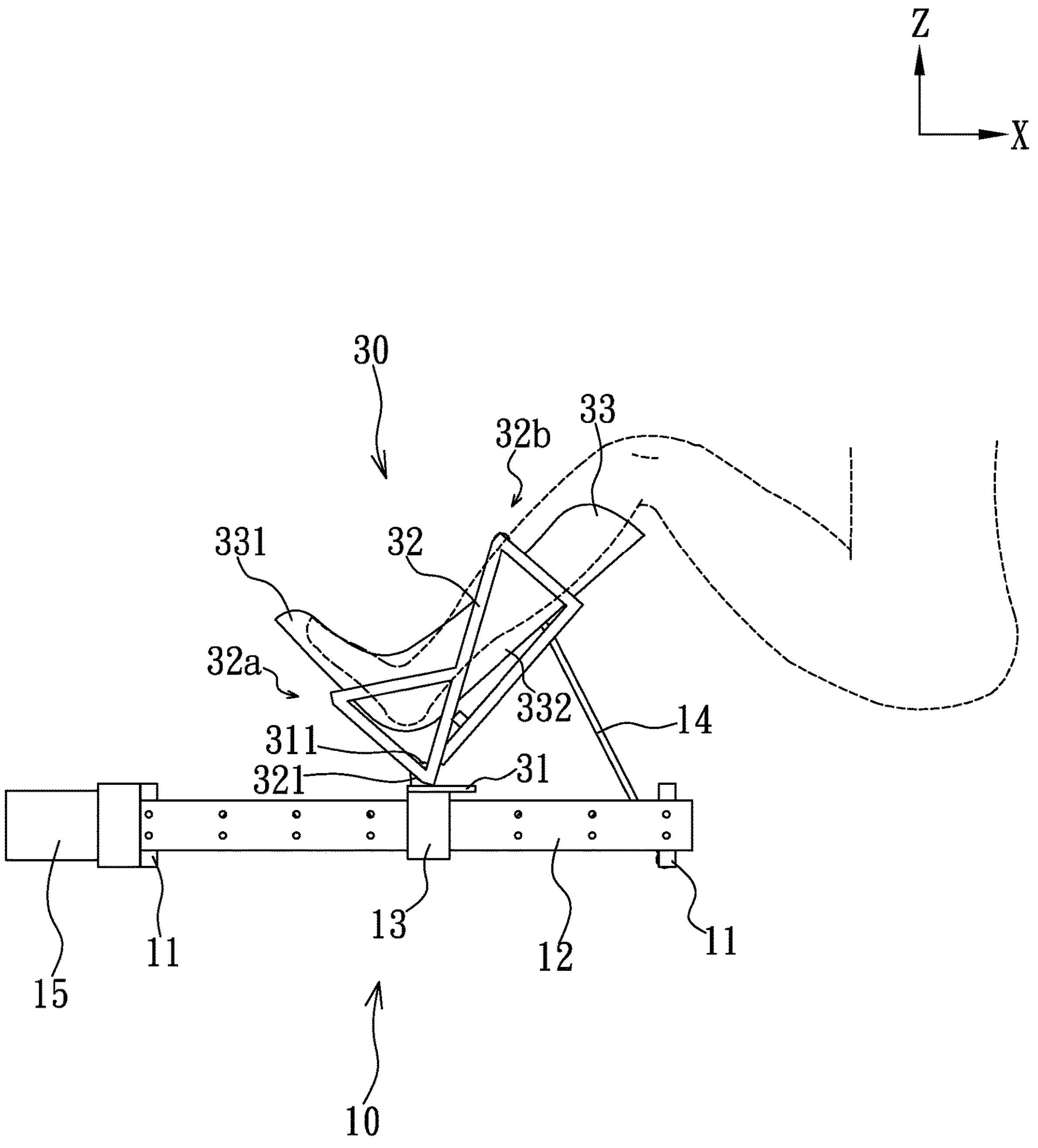
FIG. 8 is fourth schematic view of the preferred embodiment of the present invention.

When a user wants to perform rehabilitation on their knee joint, they can select and mount the knee joint rehabilitation frame 30 on the drive device 10 for use, wherein the knee joint rehabilitation frame 30 comprises at least a bottom base 31, a support 32, and a leg bracket 33. The bottom base 31 is fixedly locked and mounted on the first slider 13 of the drive device 10. The bottom base 31 is provided with a pivot portion 311, which is mounted along the Y-direction to the drive device 10. The support 32 is separated into a front end **32*a* and a rear end 32*b*, wherein the bottom portion of the front end 32*a* is fitted with a rotating shaft 321, which is pivot connected to the pivot portion 311 (as shown in FIG. 5), and the top portion of the rear end 32*b* is pivot connected to the connecting rod 14 of the drive device 10 (as shown in FIG. 6), which enables controlling and limiting the angle of the support 32. The leg bracket 33 is then fitted to the support 32, wherein the leg bracket 33 is provided with at least a foot portion 331 and a support portion 332, which allow the user, when lying down or in a seated position, to place their foot and lower leg on the leg bracket 33 (as shown in FIGS. 7 and 8). When the drive device 10 rotates the drive screw 111, the drive screw 111 controls front/rear sliding of the first slider 13 and the knee joint rehabilitation frame 30 along the X-direction to the drive device 10, and because the front end 32*a* and the rear end 32*b* are pivot connected to the pivot portion 311 of the bottom base 31 and the connecting rod 14 of the drive device 10, respectively, during the sliding process of the first slider 13, the drive screw 111 also connectively drives and controls rotation of the support 32. When the first slider 13 slides towards the user, rotation of the support 32 causes the rear end 32*b* to upwardly displace, and vice versa downwardly displace (as shown in FIGS. 7 and 8**), accordingly performing a repetitive extension and bending knee movement on the user's leg, thereby achieving the object of providing rehabilitation movement of the knee joint on the user's own accord.

Figure 9:
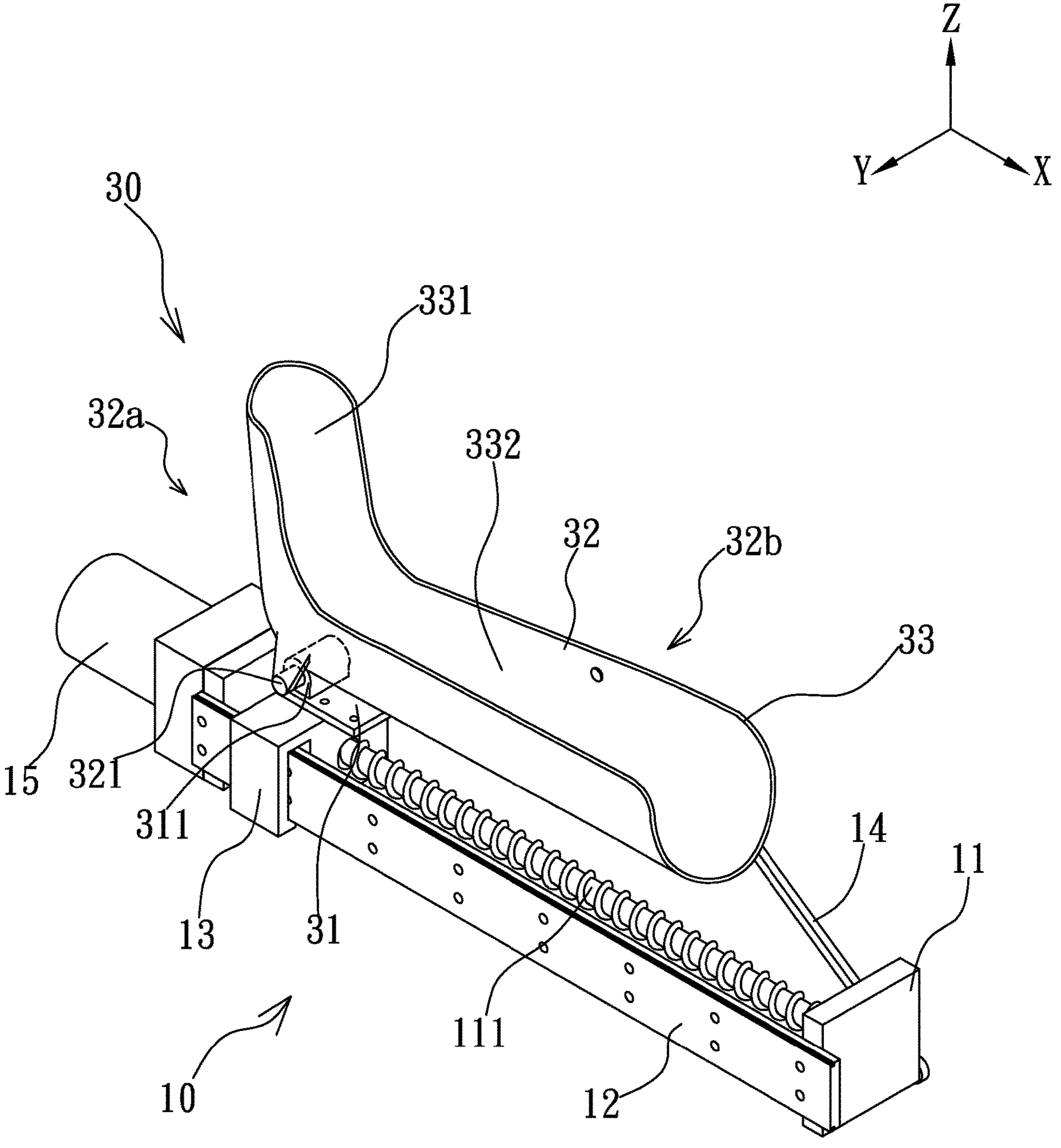
FIG. 9 is fifth schematic view of the preferred embodiment of the present invention.

In addition, in a preferred embodiment of the present invention, the support 32 and the leg bracket 33 of the knee joint rehabilitation frame 30 is a single body design, that is, the support 32 is the leg bracket 33 (as shown in FIG. 9), Furthermore, the leg and ankle support frame 23 of the hip joint rehabilitation frame 20 and the leg bracket 33 of the knee joint rehabilitation frame 30 can further comprise at least one fastening strap (not shown in the drawings), which enables stabilizing the user's leg on the leg bracket 33 of the leg and ankle support frame 23.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A dual-purpose hip and knee joint rehabilitation apparatus, which is used to perform repetitive movement rehabilitation on a user's hip joint or knee joint according to the user's selected requirement, wherein the rehabilitation apparatus comprises at least a drive device, a hip joint rehabilitation frame, and a knee joint rehabilitation frame, whereby the user selects one of the rehabilitation frames to mount on the drive device, wherein the drive device comprises at least a base, a first slide rail, a first slider, and a connecting rod; the base is provided with a drive screw, the drive screw is installed along an X-direction to the drive device; the first slide rail is mounted on a side of the base, the first slide rail is configured parallel to the drive screw; the first slider is slide inserted on the first slide rail and the drive screw, to enable sliding along the X-direction to the drive device, and is drive controlled by the drive screw; one end of the connecting rod is pivot connected to the base, and another end of the connecting rod is pivot connected to the knee joint rehabilitation frame;

the hip joint rehabilitation frame comprises at least a second slide rail, a second slider, and a leg and ankle support frame; the second slide rail is mounted on the first slider of the drive device when the hip joint rehabilitation frame is selected by the user, the second slide rail is configured along a Y-direction to the drive device; the second slider is installed on the second slide rail, to enable sliding along the Y-direction to the drive device; the leg and ankle support frame is thereby fixed onto the second slider and is used to saddle support the user's leg and ankle; moreover, the leg and ankle support frame is equipped with a universal joint, which allows the leg and ankle support frame to be adjusted to a supporting angle to match the user's leg posture;

the knee joint rehabilitation frame comprises at least a bottom base, a support, and a leg bracket; the bottom base is mounted on the first slider of the drive device when the knee joint rehabilitation frame is selected by the user, to enable sliding along the X-direction to the drive device, and the bottom base is provided with a pivot portion along the Y-direction to the drive device; the support is separated into a front end and a rear end; a bottom portion of the front end is fitted with a rotating shaft, the rotating shaft is pivot connected to the pivot portion; the top portion of the rear end of the support is pivot connected to the connecting rod of the drive device, the connecting rod is used to control and limit the rotating angle of the support; the leg bracket is fitted to the support, the leg bracket is used to saddle support the user's foot and lower leg.

2. The dual-purpose hip and knee joint rehabilitation apparatus according to claim 1, wherein the drive device uses at least an electric-powered motor to provide a driving force.

3. The dual-purpose hip and knee joint rehabilitation apparatus according to claim 2, wherein the electric-powered motor is a stepping motor.

4. The dual-purpose hip and knee joint rehabilitation apparatus according to claim 1, wherein the drive device uses at least an air-powered motor to provide a driving force.

5. The dual-purpose hip and knee joint rehabilitation apparatus according to claim 1, wherein the leg bracket of the knee joint rehabilitation frame is provided with a foot portion and a support portion.

6. The dual-purpose hip and knee joint rehabilitation apparatus according to claim 1, wherein the leg bracket or the leg and ankle support frame further comprises at least one fastening strap.

7. The dual-purpose hip and knee joint rehabilitation apparatus according to claim 1, wherein the support and the leg bracket of the knee joint rehabilitation frame is a single body.

* * * * *